United States Patent [19]
Di Gaetano

[11] 3,793,497
[45] Feb. 19, 1974

[54] KEY EJECTING VEHICLE IGNITION SWITCH
[76] Inventor: Dante Di Gaetano, 1021 Old Lane St., Drexel Hill, Pa. 19026
[22] Filed: Nov. 8, 1972
[21] Appl. No.: 304,795

[52] U.S. Cl............ 200/44, 307/10 AT, 200/61.93, 70/239
[51] Int. Cl........................... H01h 9/28, H01h 27/6
[58] Field of Search....... 307/10 AT; 200/44, 61.93; 70/239

[56] References Cited
UNITED STATES PATENTS
3,360,619 12/1967 Grocott.................................. 200/44
3,484,569 12/1969 Euston................................... 200/44
3,552,160 1/1971 Kleebauer............................. 200/44

Primary Examiner—Robert K. Schaefer
Assistant Examiner—Gerald P. Tolin
Attorney, Agent, or Firm—Karl L. Spivak

[57] ABSTRACT

An ignition starter switch assembly including a housing and a concentric cylinder which is rotatable within the housing in response to rotary forces imposed by a key operated tumbler lock. The cylinder terminates inwardly in an eccentric drive lug which seats within an eccentric socket provided in a cooperating switch cap to transmit rotary forces from the key to the switch cap for ignition contact purposes. The cylinder is provided with an eccentric bore which rotates into alignment with the key slot when the switch contact is opened. A spring biased plunger is seated within the eccentric bore and serves to automatically eject the key when the eccentric bore aligns with the key slot.

1 Claim, 5 Drawing Figures

PATENTED FEB 19 1974                                    3,793,497

KEY EJECTING VEHICLE IGNITION SWITCH

BACKGROUND OF THE INVENTION

This invention relates generally to automotive vehicles and, more particularly, is directed to an ignition starter switch assembly therefor.

Quite often, ignition keys are inadvertently left in the ignition switch lock upon leaving the vehicle, thus resulting in the possibility of automobile theft or possibly enabling the occupant of the vehicle to accidentally lock the doors of the vehicle with no other means of entry for regaining access to the interior of the vehicle. Prior workers in the field have developed locks with automatic key ejectors as exemplified in U.S. Pat. Nos. 1,712,640 and 1,738,105, but these devices have proved unsatisfactory when it was attempted to adapt the constructions to additionally operate a switch, such as an automobile ignition switch. Additionally, prior art constructions have tended to become unduly cumbersome and expensive in manufacture.

SUMMARY OF THE INVENTION

The present invention relates to the field of automotive, locking devices, and more particularly, is directed to an automobile ignition starter switch assembly incorporating automatic key ejection means.

The present device incorporates a rotatable cylinder which terminates inwardly in an eccentric drive lug. An inwardly positioned switch cap carries an eccentric socket within which the drive lug seats to thereby rotate the switch cap when the cylinder is rotated for ignition switch operating purposes. The cylinder is further provided with a forwardly opening, eccentric bore within which is positioned a spring biased plunger. When the ignition switch is turned off by means of a key operated tumbler lock, the eccentric bore rotates into alignment with the key slot in the tumbler lock to thereby automatically eject the key by means of the plunger spring.

It is therefore an object of the present invention to provide an improved ignition starter switch of the type set forth.

It is another object of the present invention to provide a novel ignition starter switch assembly which will automatically eject the ignition key from the tumbler lock portion thereof upon turning the ignition switch to a normally locked position, thus preventing the ignition key from being left in the ignition switch.

It is further object of the present invention to provide an ignition starter switch assembly that includes a switch for controlling energization of the starter motor, a tumbler lock for controlling the opening and closing of the switch, and a rotation transmitting member interposed between the tumbler lock and the ignition switch for operating the switch in response to the insertion and rotation of the ignition key, which switch assembly further includes an ejector mechanism for automatically ejecting the key from the switch assembly after the tumber lock has been returned to a normally locked position and the key is free to be withdrawn from the tumbler lock slot.

It is a further object of the present invention to provide an ignition starter switch assembly of the type described in which the key ejector is prevented from ejecting the key from the tumbler lock in all positions of the starter switch unit except the normally locked position thereof, thus enabling such tumber lock to control the energization of the starter motor directly through the switch assembly, and enabling such switch assembly to retain the key in an operative position throughout the continued use of the vehicle and until the tumbler lock has been returned to a normally locked position.

It is another object of the present invention to provide a novel ignition starter switch construction that is rugged in construction, inexpensive in manufacture and trouble free when in use.

Other objects and a fuller understanding of the invention will be had by referring to the following description and claims of a preferred embodiment thereof, taken in conjunction with the accompanying drawings wherein like reference characters refer to similar parts throughout the several views and in which:

DESCRIPTION OF THE PREFERRED EMBODIMENT OF THE INVENTION

Figure 2:
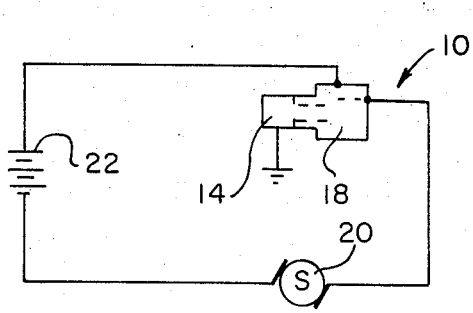
FIG. 2 is a schematic wiring diagram of an ignition starter switch assembly controlling an automobile starter motor.

Although specific terms are used in the following description for the sake of clarity, these terms are intended to refer only to the particular structure of my invention selected for illustration in the drawings, and are not intended to define or limit the scope of the invention.

Figure 1:
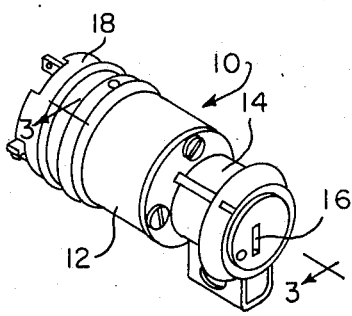
FIG. 1 is a perspective view of an ignition starter switch assembly made in accordance with the present invention.

Referring now to the drawings, I show in FIG. 1 an ignition starter switch assembly 10 which includes a main housing 12 having a tumbler lock 14 operatively connected at one end thereof. The tumbler lock 14 has a key receiving slot 16 and is conventionally operated by means of a key 15. A switch unit 18 operatively positions at the inward end of the main housing 12 and is wired to control energization of a starter motor 20. As shown in FIG. 2, the starter motor 20 is connected in series circuit relationship with the vehicle battery 22 and the switch unit 18.

Figure 3:
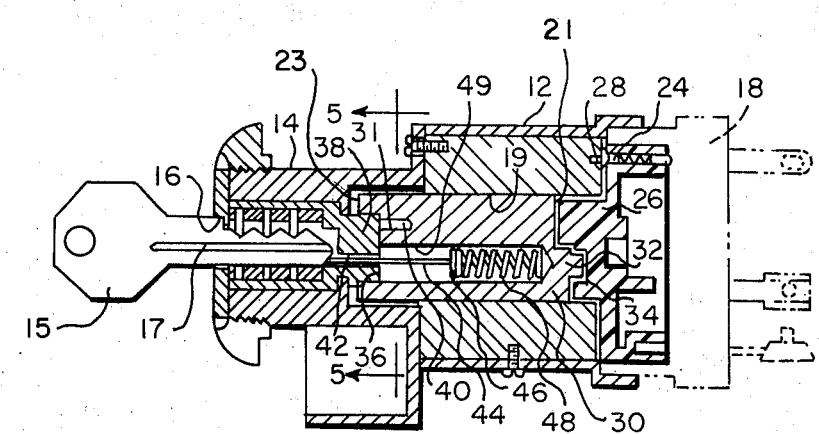
FIG. 3 is an enlarged longitudinal cross sectional view taken along Line 3—3 of FIG. 1, with the key inserted in the tumbler lock thereof and with the switch portion thereof in a closed position.

As is more clearly shown in FIG. 3 of the drawing, the switch unit 18 includes a spring biased contact 24 which is rotatable into circuit closing engagement with a fixed contact 28 mounted within the main housing 12. The fixed contact 28 is conventionally connected to the ground side of the battery 22 through the dashboard and vehicle parts (not shown) upon which the housing 12 is mounted. The interior of the housing 12 is provided with a longitudinal bore 19 within which a motion transmitting cylinder 30 is rotatably received. The innermost end 21 of the cylinder 30 is provided with an eccentric drive lug 32 which is received within an eccentric socket 34 of the rotatable switch cap 26 upon which the spring biased contact 24 is supported. The opposite end 23 of the cylinder 30 is provided with a recess 36 within which an extension 38 of the tumbler lock 14 is received. This extension 38 is provided with an eccentric drive pin 40 that is receivable within an aligned eccentric opening 31 which is provided in the end 23 of the cylinder 30. Thus, in response to the insertion of the key 15 within the slot 16 of the tumbler lock 14, rotation forces of the tumbler lock are transmitted to the rotatable switch cap 26 of the control switch assembly 18 through the connecting cylinder 30.

The extension 38 of the tumbler cylinder is also provided with an eccentric opening 42 within which one end of a push bar 44 is slidably received for reciprocating longitudinal movement relative to the tumbler key receiving slot 16. The opposite end of the push bar 44 is provided with a cap 46 against which one end of a compression spring 48 acts. The compression spring 48 is mounted within an eccentric longitudinal bore 49 of the cylinder 30, and biases longitudinally therein. The other end of the spring 48 acts against the inner end 47 of the bore 49 to provide a constant outward pressure upon the push bar 44 in the direction of the slot 16.

Figure 5:
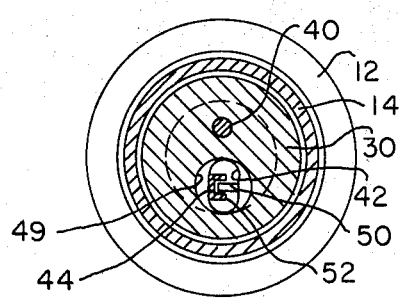
FIG. 5 is an enlarged transverse cross sectional view taken along Line 5—5 of FIG. 3.

As is more clearly shown in FIG. 5 of the drawing, the push bar 44 is provided with a longitudinal groove 52 which slidably receives a guide element 50 in much the same manner as the guide groove 17 in the key 15 conventionally receives its tumbler guide element (not shown). Thus, in response to insertion of the key 15, the push bar 44 is moved to the retracted position shown in FIG. 3 and retained in such position by the pressure of the key 15 as the tumbler lock 14 is rotated to close the circuit through the switch 18 and the starter motor 20.

Figure 4:
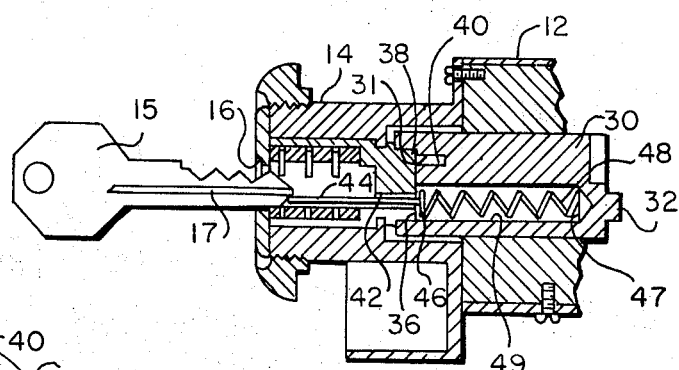
FIG. 4 is a partial cross sectional view similar to FIG. 3, showing the manner in which the key is ejected upon return of the parts to a normally locked position.

The tumbler lock 14 has the usual parts (not shown) which cooperate with the key 15, in a conventional manner, to retain the key 15 in the inserted position in all rotated positions of the key. In the initial normally locked position thereof, the key 15 is free to be withdrawn manually and under the action of the compression coil spring 48 acting through the push bar 44, as shown in FIG. 4.

It will now be recognized that an ignition starter switch assembly has been provided which provides for the closing of a contained switch assembly 18 in response to rotation of a key 15 received within a tumbler operated lock 14. The key 15 is automatically ejected by the push bar 44 when the parts have been returned to the initially locked position, in which initial position, the switch 18 opens the circuit through the starter motor and the ignition system of the vehicle. Thus, with the present ignition switch assembly, it is impossible to remove the key 15 except when the lock has been returned to the initially locked position. The ignition starter switch assembly automatically assures the deenergization of the vehicle ignition system and the positive spring biased removal of the key from the ignition switch assembly when the key is turned to its initial position.

Although I have described the present invention with reference to the particular embodiments therein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

I claim:

1. In an ignition starter switch assembly, for use in an automotive ignition system of the type employing an electrical energy source, the combination of
   A. a main housing having a forward end and a rearward end,
      1. said main housing being provided with a longitudinal bore,
      2. a fixed electrical contact carried in the said rearward end, said fixed electrical contact connecting to the electrical energy source which is exterior of the said ignition starter switch assembly;
   B. a motion transmitting cylinder positioned within the main housing and being rotatable therewithin in response to key lock operation,
      1. said cylinder being provided with an eccentric longitudinal bore,
      2. said cylinder having a forward end and a rearward end,
      3. said rearward end terminating rearwardly in an eccentric drive lug.
         a. the said longitudinal bore and the drive lug being positioned in longitudinal alignment,
      4. said forward end being provided with an eccentric opening;
   C. a switch unit rearwardly connecting to the cylinder,
      1. said switch unit being provided with a forwardly facing eccentric socket,
         a. said eccentric drive lug of the cylinder positioning within the eccentric socket to transmit rotary motion to the switch unit when the cylinder is rotated,
      2. a forwardly facing spring contact carried by the switch unit,
         a. said spring contact being rotated into electrically conductive engagement with the fixed contact when the cylinder is rotated;
   D. a tumbler lock forwardly connected to the cylinder,
      1. said tumbler lock carrying a rearwardly projecting, eccentric drive pin,
      2. said drive pin being inserted into the eccentric opening of the cylinder to turn the cylinder when the tumbler lock is key operated,
      3. said tumbler lock being provided with a key receiving slot to receive a key therein,
         a. said tumbler lock further being provided with an eccentric opening communicating between the key slot and the said longitudinal bore of the cylinder;
   E. a spring biased push bar positioned within the eccentric bore of the cylinder and having longitudinal movement into the key slot,
      1. said push bar being continuously biased forwardly into the key slot by a compression spring,
         a. said compression spring acting within the eccentric bore of the cylinder.

* * * * *